United States Patent
Haruna et al.

Patent Number: 5,112,891
Date of Patent: May 12, 1992

[54] POLYCARBONATE RESIN COMPOSITION

[75] Inventors: Tohru Haruna; Masayuki Takahashi; Toshinori Yukino, all of Saitama, Japan

[73] Assignee: Asahi Denka Kogyo Kabushiki Kaisha, Tokyo, Japan

[21] Appl. No.: 573,722

[22] Filed: Aug. 28, 1990

[30] Foreign Application Priority Data

Sep. 6, 1989 [JP] Japan .................. 1-230779

[51] Int. Cl.$^5$ .............................. C08K 5/527
[52] U.S. Cl. .................. 524/101; 524/117; 524/147; 524/304
[58] Field of Search ............... 524/117, 147, 304, 101

[56] References Cited

U.S. PATENT DOCUMENTS 4,885,326 12/1989 Haruna et al. .................. 524/117
5,064,885 11/1991 Muller et al. .................. 524/117

FOREIGN PATENT DOCUMENTS 55-151058 11/1980 Japan .
58-103537 6/1983 Japan .

Primary Examiner—Veronica P. Hoke
Attorney, Agent, or Firm—Depaoli & O'Brien

[57] ABSTRACT

A polycarbonate resin composition improved in heat resistance by the addition of an organic cyclic phosphite represented by the general formula:

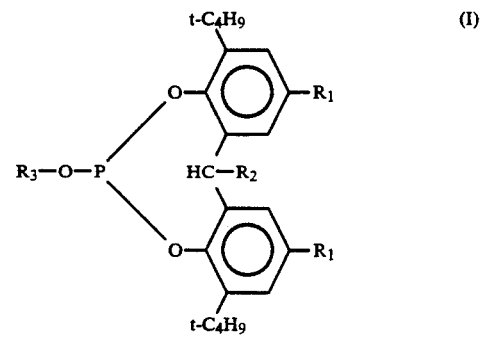

wherein $R_1$ represents an alkyl group having 1 to 9 carbon atoms; $R_2$ represents a hydrogen atom or an alkyl group having 1 to 4 carbon atoms; and $R_3$ represents an alkyl group having 1 to 30 carbon atoms.

10 Claims, No Drawings

POLYCARBONATE RESIN COMPOSITION

BACKGROUND OF THE INVENTION

1. FIELD OF THE INVENTION

The present invention relates to a stabilized polycarbonate resin composition, in particular a polycarbonate resin composition stabilized by the addition of a specific organic cyclic phosphite.

2. DESCRIPTION OF THE PRIOR ART

Polycarbonate resins exhibit high strength and high stiffness and have excellent frictional wear resistance. Accordingly, polycarbonate resins are widely used in the production of automobiles parts, such as bumpers, and parts for various precision machinery such as business machines.

Further, polycarbonate resins have excellent transparency and color tone and are, thus, used in optical fields including laser disks or in the production of automotive mirrors polycarbonates are also useful particularly as engineering plastics.

However, the molding of a polycarbonate resin must be generally conducted at a temperature as high as about 350° C. At this high temperature, the carbonate linkages of the backbone chain are broken down during molding, thus, causing discoloration and/or lowering of the mechanical strength of the polycarbonate resin. Further, in molding a polycarbonate resin into an article having a thin wall or a complicated shape, a particularly high temperature is necessitated in order to lower the melt viscosity of the resin. Again, the thermal deterioration of the resin is significant.

Thus, the use of various antioxidants has been proposed. However, the discoloration of a polycarbonate resin is not inhibited by the use of a phenolic antioxidant. Stabilized polycarbonate resin compositions which have been proposed up to this time include, for example, a composition comprising a polycarbonate resin having an average molecular weight of 15000 to 18000 and a phosphite ester (see Japanese Patent Laid-Open No. 126119/1983), a polycarbonate resin composition containing a fatty acid ester of a polyhydric alcohol, a phosphate ester and a phosphite ester (see Japanese Patent Laid-Open No. 287954/1986), a polycarbonate resin composition containing a pentaerythritol phosphite (see Japanese Patent Laid-Open No. 112655/1988) and a polycarbonate resin composition containing a phosphonium sulfonate and a phosphite ester (see Japanese Patent Laid-Open No. 14267/1989). Such compositions are also unsatisfactory. Accordingly, there is a need to develop a polycarbonate resin composition which is sufficiently resistant to thermal deterioration in high-temperature molding.

SUMMARY OF THE INVENTION

It has now been found that a polycarbonate resin composition having high heat resistance fit for practical use can be obtained by adding a specific organic cyclic phosphite to a polycarbonate resin.

The present invention provides a stabilized polycarbonate resin composition comprising 100 parts by weight of a polycarbonate resin and 0.001 to 5 parts by weight of an organic cyclic phosphite represented by the general formula:

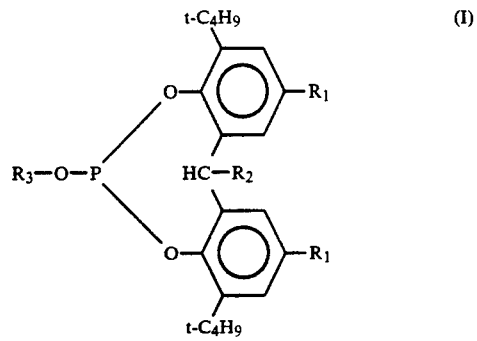

wherein $R_1$ represents an alkyl group having 1 to 9 carbon atoms; $R_2$ represents a hydrogen atom or an alkyl group having 1 to 4 carbon atoms; and $R_3$ represents an alkyl group having 1 to 30 carbon atoms.

DESCRIPTION OF THE PREFERRED EMBODIMENTS

The alkyl group having 1 to 9 carbon atoms defined with respect to $R_1$ in the above general formula (I) includes methyl, ethyl, propyl, isopropyl, butyl, sec-butyl, tert-butyl, isobutyl, amyl, tert-amyl, hexyl, heptyl, octyl, isooctyl, 2-ethylhexyl, tert-octyl, nonyl and tert-nonyl groups. The alkyl group having 1 to 4 carbon atoms defined with respect to $R_2$ includes methyl, ethyl, propyl, isopropyl, butyl, sec-butyl, tert-butyl and isobutyl groups. Further, the alkyl group having 1 to 30 carbon atoms defined with respect to $R_3$ includes methyl, ethyl, propyl, isopropyl, butyl, sec-butyl, tert-butyl, isobutyl, amyl, tert-amyl, hexyl, heptyl, octyl, isooctyl, 2-ethylhexyl, tert-octyl, nonyl, tert-nonyl, decyl, isodecyl, dodecyl, tetradecyl, hexadecyl, octadecyl, eicosyl, docosyl, tetracosyl and triacontyl groups.

Representative examples of the organic cyclic phosphite of the general formula (I) according to the present invention will now be given.

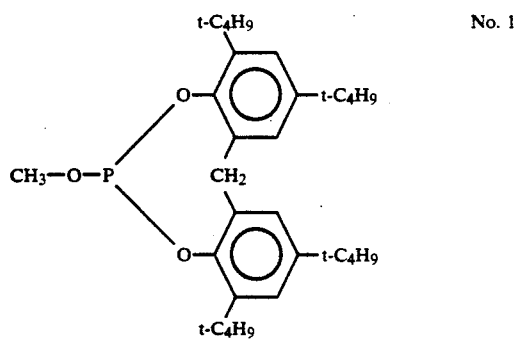

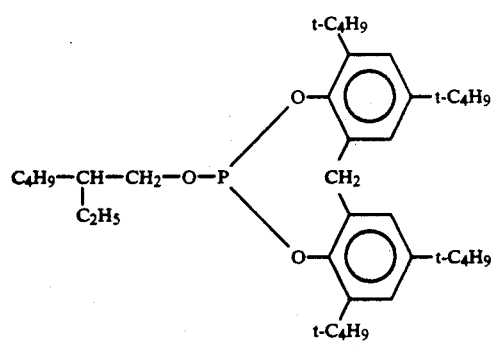

No. 2

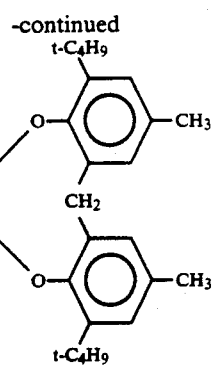

No. 6

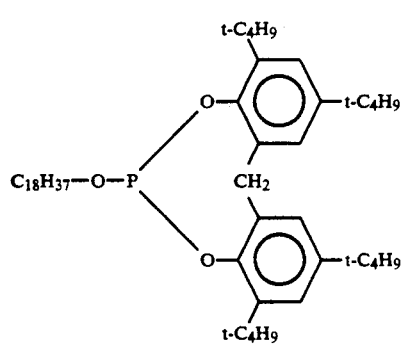

No. 3

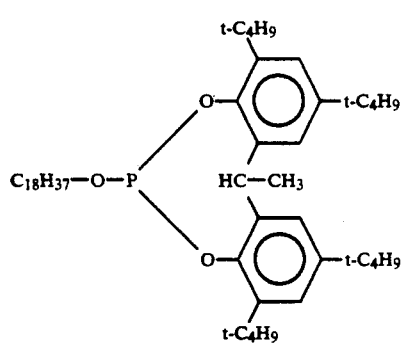

No. 4

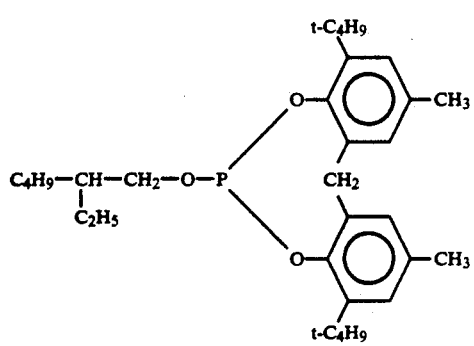

No. 5

According to the present invention, the organic phosphite represented by the general formula (I) should be used in an amount of 0.001 to 5 parts by weight per 100 parts by weight of the polycarbonate resin.

The method of adding the organic cyclic phosphite represented by the general formula (I) to the polycarbonate resin is not particularly limited as any conventional method can be used.

The polycarbonate resin to be stabilized with the organic cyclic phosphite (I) according to the present invention is a high-molecular carbonate of bisphenol.

The bisphenol to be used in the preparation of the polycarbonate resin includes bisphenols such as bis(4-hydroxyphenyl)methane, 2,2-bis(4-hydroxyphenyl)propane, 2,2-bis(4-hydroxy-3-methyl-phenyl)propane, 4,4-bis(4-hydroxyphenyl)heptane, 2,2-bis(4-hydroxy-3,5-dichlorophenyl)propane and 2,2-bis(4-hydroxy-3,5-dibromophenyl)propane; bis(4-hydroxyphenyl) ether; dihydroxydiphenyls such as p,p'-dihydroxydiphenyl and 3,3'-dichloro-4,4,'-dihydroxydiphenyl; dihydroxy sulfones such as bis(4-hydroxyphenyl) sulfone and bis(3,5-dimethyl-4-hydroxphenyl) sulfone; dihydroxybenzenes such as 1,4-dihydroxy-2,5-dichlorobenzene and 1,4-dihydroxy-3-methylbenzene; resorcinol; hydroquinone and halo-or alkyl-substituted dihydroxybenzene; and bis-(hydroxyphenyl) sulfoxide such as bis(4-hydroxyphenyl) sulfoxide. Other various bisphenols can be also used in the preparation of the polycarbonate resin. Further, a mixture of two or more of the compounds listed above may be used in the preparation of the aromatic carbonate polymer to be used in the present invention.

The aromatic carbonate polymer to be used in the present invention is one prepared by the reaction between a dihydric phenol and a carbonate precursor. The carbonate precursor includes carbonyl halides, carbonate esters and haloformates. The carbonyl halide includes carbonyl bromide, carbonyl chloride and a mixture of them. The carbonate ester includes diphenyl carbonate, di(chlorophenyl) carbonate, ditolyl carbonate, dinaphthyl carbonate and mixtures of two or more of them. The haloformate includes dihydric phenol haloformates such as hydroquinone bischloroformate and glycol haloformates such as ethylene glycol haloformate. Among these carbonates precursors, carbonyl chloride, i.e. phosgene, is particularly suitable.

The aromatic carbonate polymer to be used in the present invention is prepared by using a molecular weight modifier and an acid acceptor.

The molecular weight modifier to be used in the preparation of the aromatic carbonate polymer includes phenol, cyclohexanol, methanol, p-t-butylphenol and p-bromophenol, among which p-t-butylphenol is particularly preferable.

The acid acceptor may be either an organic or an inorganic one. The organic acid acceptor includes pyridine, triethylamine and dimethylaniline, while the inorganic acid acceptor include hydroxides, carbonates, bicarbonates and phosphates of alkali and alkaline earth metals.

The composition of the present invention may optionally contain known heat stabilizers, antioxidants, and other additives. Particularly, the addition of a phenolic antioxidant is extremely effective.

Examples of the phenolic antioxidant include 2,6-di-t-butyl-p-cresol, 2,6-diphenyl-4-octadecyl-oxyphenol, distearyl 3,5-di-t-butyl-4-hydroxybenzyl-phosphate, 4,4'-thiobis(6-t-butyl-m-cresol), 2-octylthio-4,6-di(3', 5'-dihydroxyphenoxy)-s-triazine, 2,2'-methylenebis(4-methyl-6-t-butylphenol), 2,2'-methylenebis(4-ethyl-6-t-butylphenol), glycol bis[3,3-bis(4'-hydroxy-3'-t-butylphenyl)] butyrate, 4,4'-butylidenebis(6-t-butyl-m-cresol), 2,2'-ethylidenebis(4,6-di-t-butylphenol), 2,2'-ethylidenebis-(4-sec-butyl-6-butylphenol), 2-t-butyl-4-methyl-6-(2'-acryloyloxy-3'-t-butyl-5'-methylbenzyl)-phenol, bis[2-t-butyl-4-methyl-6-(2'-hydroxy-3'-t-butyl-5'-methylbenzyl)phenyl] terephthalate, 1,1,3-tris(2'-methyl-4'-hydroxy-5'-t-butylphenyl)butane, 1,3,5-tris(2', 6'-dimethyl-3'-hydroxy-4'-t-butylbenzyl) isocyanurate, 1,3,5-tris(3', 5'-di-t-butyl-4'-hydroxybenzyl) isocyanurate and 1,3,5-tris(3', 5'-di-ti-butyl-4'-hydroxybenzyl)-2,4,6-trimethylbenzene.

The composition of the present invention may further contain a sulfur antioxidant to improve the oxidation resistance. Examples of the sulfur antioxidant include dialkyl thiodipropionates such as dilauryl, dimyristyl and distearyl thiodipropionates; and polyol β-alkylmercaptopropionates such as pentaerythritol tetra β-dodeyclmercaptopropionate).

The composition of the present invention may further contain a light stabilizer such as an ultraviolet absorber or a hindered amine to improve the light stability.

Examples of the light stabilizer include 2-hydroxybenzophenones such as 2,4-dihydroxybenzophenone, 2-hydroxy-4-methoxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazoles such as 2-(2'-hydroxy-5'-methylphenyl)benzotriazole, 2-(2'-hydroxy-5'-t-octylphenyl)benzotriazole, 2-(2'-hydroxy-3,5'-di-t-butylphenyl)benezotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2(2'-hydroxy-3', 5'-dicumylphenyl)-benzotriazole and 2,2'-methylenebis(4-t-octyl-6-benzotriazolyl)phenol; benzoates such as phenyl salicylate, resorcinol monobenzoate, 2,4-di-t-butylphenyl 3', 5'-di-t-butyl-4'-hydroxybenzoate and hexadecyl 3,5-di-t-butyl-4-hydroxybenzoate; substituted oxanilides such as 2-ethyl-2'-ethoxyoxanilide and 2-ethoxy-4'-dodecyloxanilide; cyanoacrylates such as ethyl α-cyano-β, β-diphenylacrylate and methyl 2-cyano-3-methyl-3-(p-methoxyphenyl)acrylate; and hindered amines such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) butanetetracarboxylate, tetrakis-(1,2,2,6,6-pentamethyl-4-piperidyl) 1,2,3,4-butanetetracarboxylate, bis(1,2,2,6,6-pentamethyl-4-piperidyl) di(tridecyl) 1,2,3,4-butanetetracarboxylate, bis(1,2,2,6,6-pentamethyl-4-piperidyl) 2-butyl-2-(3,5-di-t-butyl-4-hydroxybenzyl)malonate, 1-(2-hydroxyethyl)-2,2,6,6-tetramethyl-4-piperidinol/-diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-t-octylamino-s-triazine polycondensate and 1,6-bis(2,2,6,6,-tetramethyl-4-piperidylamino)hexane/2,4-dichloro-6-morpholino-s-triazine polycondensate.

If necessary, the composition of the present invention may further contain various additives. Examples thereof include heavy metal inactivator, nucleating agent, metal soap, pigment, filler, organotin compound, plasticizer, epoxy compound, blowing agent, antistatic agent, flame retardant, lubricant and processing aid.

The present invention will now be described in more detail by referring to the following Examples, though the present invention is not limited by them.

EXAMPLE 1

0.3 part by weight of an organic cyclic phosphite listed in Table 1 was added to 100 parts by weight of a polycarbonate resin of bisphenol A type having an average molecular weight of 21000. The obtained mixture was extruded and pelletized with a twin-screw extruder at 280° C. The obtained pellets were dried with hot air and molded into a test piece with an injection molding machine at 290° C.

This test piece was placed in a Geer oven, heated at 230° C. for 45 minutes and examined for discoloration by observation.

The results are given in Table 1.

TABLE 1

| No. | Phosphite | Color of test piece |
|---|---|---|
| Comp. Ex. | | |
| 1-1 | distearyl pentaerythritol diphosphite | light brown |
| 1-2 | tris(2,4-di-t-butylphenyl) phosphite | yellow |
| Ex. | | |
| 1-1 | compound no. 1 | colorless |
| 1-2 | compound no. 2 | colorless |
| 1-3 | compound no. 3 | pale yellow |
| 1-4 | compound no. 4 | colorless |
| 1-5 | compound no. 5 | pale yellow |
| 1-6 | compound no. 6 | colorless |

EXAMPLE 2

0.15 part by weight of tetrakis[methylene-β-(3,5-di-ti-butyl-4-hydroxyphenyl)propionate] methane and 0.15 part by weight of an organic cyclic phosphite listed in Table 2 were added to 100 parts by weight of a polycarbonate resin of bisphenol A type having an intrinsic viscosity of 0.57 (in dioxane at 30° C.). The obtained mixture was pelletized with a twin-screw extruder at 280° C. The obtained pellets were dried with hot air and injected into a test piece at 300° C. with an injection molding machine to determine the yellowness after the residence for 5 minutes, which was compared with that before the residence.

The results are given in Table 2.

TABLE 2

| No. | Phosphite | Yellowness before residence | Yellowness after residence |
|---|---|---|---|
| Comp. Ex. | | | |
| 2-1 | tetra(tridecyl)4,4-butylidenebis(3-methyl-6-t-butyl-phenol)diphosphite | 15.0 | 20.3 |
| 2-2 | bis(2,6-di-t-butyl-4-methylphenyl) pentaerythritol diphosphite | 13.9 | 19.5 |
| Ex. | | | |
| 2-1 | compound no. 1 | 7.5 | 9.8 |
| 2-2 | compound no. 2 | 7.8 | 10.1 |
| 2-3 | compound no. 3 | 8.0 | 10.4 |
| 2-4 | compound no. 4 | 7.7 | 10.2 |
| 2-5 | compound no. 5 | 7.5 | 9.7 |
| 2-6 | compound no. 6 | 7.8 | 10.4 |

EXAMPLE 3

In order to determine the effect of the simultaneous use of the organic cyclic phosphite of the present invention and a light stabilizer, a blend comprising 100 parts by weight of a polycarbonate resin having an average molecular weight of 29000, 0.1 part by weight of an organic cyclic phosphite no.4 and 0.3 part by weight of a light stabilizer listed in Table 3 was molded into a test piece in the same manner as that of Example 1.

The obtained test piece was irradiated with ultraviolet rays from a high-pressure mercury lamp for 2 weeks to determine the yellowness according to ASTM D 1925. The yellowness thus determined was compared with that of an unirradiated test piece to calculate the change ($\Delta E$).

The results are given in Table 3.

TABLE 3

| No. | Light stabilizer | $\Delta E$ |
|---|---|---|
| Comp. Ex. | | |
| 3-1 | 2-(2'-hydroxy-5'-methyl-phenyl)-benzotriazole (no phosphite) | 16.7 |
| 3-2 | 2-(2'-hydroxy-3',5'-dicumylphenyl)-benzotriazole (no phosphite) | 15.5 |
| 3-3 | 2,2'-methylenebis(4-methyl-6-benzotriazolylphenol) (no phosphite) | 11.0 |
| Ex. | | |
| 3-1 | 2-(2'-hydroxy-5'-methylphenyl)-benzotriazole | 6.8 |
| 3-2 | 2-(2'-hydroxy-3',5'-dicumylphenyl)-benzotriazole | 6.4 |
| 3-3 | 2,2'-methylenebis(4-methyl-6-benzotriazolylphenol) | 5.5 |

EXAMPLE 4

50 parts by weight of a polycarbonate resin, 50 parts by weight of a maleimide-modified ABS resin, 0.2 part by weight of 1,3,5-tris(3', 5'-di-t-butyl-4-40 -hydroxybenzyl) isocyanurate and 0.3 part by weight of an organic cyclic phosphite listed in Table 4 were blended together and molded into a test piece in the same manner as that of Example 2. This test piece was examined for whiteness after the residence for 5 minutes, which was compared with that before the residence.

The results are given in Table 4.

TABLE 4

| No. | Phosphite | Whiteness before residence | Whiteness after residence |
|---|---|---|---|
| Comp. Ex. | | | |
| 4-1 | bis(2,4-di-t-butylphenyl) pentaerythritol diphosphite | 34.4 | 23.5 |
| 4-2 | tetra-mixed $C_{12 \sim 15}$ alkyl) 4,4'-isopropylidenediphenyl diphosphite | 30.2 | 19.4 |
| Ex. | | | |
| 4-1 | compound no. 1 | 41.3 | 29.1 |
| 4-2 | compound no. 2 | 40.9 | 28.4 |
| 4-3 | compound no. 3 | 40.2 | 27.3 |
| 4-4 | compound no. 4 | 40.5 | 27.2 |
| 4-5 | compound no. 5 | 41.0 | 28.7 |
| 4-6 | compound no. 6 | 40.6 | 27.4 |

It should be understood from the above results that the heat resistance of a polycarbonate resin can be improved by the addition of the specific organic cyclic phosphite according to the present invention.

What is claimed is:

1. A polycarbonate resin composition comprising 100 parts by weight of a resin component consisting essentially of an aromatic polycarbonate resin and 0.001 to 5 parts by weight of an organic cyclic phosphite represented by the general formula:

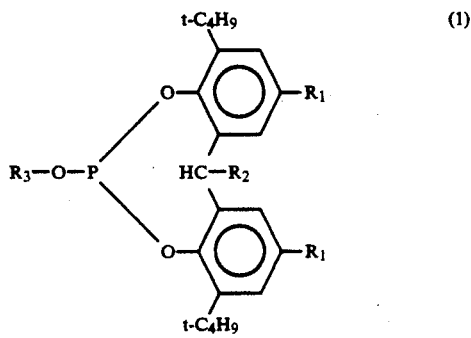

(1)

wherein $R_1$ represents an alkyl group having 1 to 9 carbon atoms; $R_2$ represents a hydrogen atom or an alkyl group having 1 to 4 carbon atoms; and $R_3$ represents an alkyl group having 1 to 30 carbon atoms.

2. The composition as claimed in claim 1, in which $R_1$ is t-$C_4H_9$, $R_2$ is hydrogen and $R_3$ is 2-ethylhexyl.

3. The composition as claimed in claim 1, in which $R_1$ is t-$C_4H_9$, is hydrogen and $R_3$ is octadecyl.

4. The composition as claimed in claim 1, in which $R_1$ is t-$C_4H_9$, is $R_2$ is hydrogen and $R_3$ is methyl.

5. The composition as claimed in claim 1, in which $R_1$ is t-$C_4H_9$, $R_2$ is methyl and $R_3$ is octadecyl.

6. The composition as claimed in claim 1, in which $R_1$ is methyl, $R_2$ is hydrogen and $R_3$ is 2-ethylhexyl.

7. The composition as claimed in claim 1, in which $R_1$ is methyl, $R_2$ is hydrogen and $R_3$ is octadecyl.

8. The composition as claimed in claim 1, further including a sulphur-containing antioxidant.

9. The composition as claimed in claim 1, further including a light stabilizer.

10. The composition as claimed in claim 1, including a phenolic antioxidant selected from the group consisting of 2,6-di-t-butyl-p-cresol, 2,6-diphenyl-4-octadecyloxyphenol, distearyl 3,5-di-t-butyl-4-hydroxybenzylphosphate, 4,4'-thiobis(6-t-butyl-m-cresol), 2-octylthio-4,6-di(3,5'-dihydroxyphenoxy)-s-triazine, 2,2'- methylenebis(4-methyl-6-t-butylphenol), 2,2'-methylenebis(4-ethyl-6-t-butylphenol), glycol bis[3,3-bis(4'-hydroxy-3'-t-butylphenol)] butyrate, 4,4'-butylidenebis(6-t-butyl-m-cresol), 2,2'-ethylidenebis(4,6-di-t-butylphenol), 2,2'-ethylidenebis-(4-sec-butyl-6-t-butylphenol), 2-t-butyl-4-methyl-6-(2'-acryloyloxy-3'-t-butyl-5'-methylbenzyl)phenol, bis[2-t-butyl-4-methyl-6-(2'-hydroxy-3'-t-butyl-5'-methylbenzyl)phenyl] terephthalate, 1,1,3-tris-(2'-methyl-4'-hydroxy-5'-t-butylphenyl)butane, 1,3,5-tris(2', 6'-dimethyl-3'-hydroxy-4'-t-butylbenzyl) isocyanurate, 1,3,5-tris(3',5'-di-t-butyl-4'-hydroxybenzyl) isocyanurate and 1,3,5-tris(3',5'-di-t-butyl-4'-hydroxybenzyl)-2,4,6-trimethylbenzene.

* * * * *